US008720345B1

(12) United States Patent
English

(10) Patent No.: US 8,720,345 B1
(45) Date of Patent: May 13, 2014

(54) PERSONAL TRANSIT VEHICLE USING SINGLE RAILS

(75) Inventor: Brendan English, Belmont, MA (US)

(73) Assignee: Rail Pod Inc., Belmont, MA (US)

( * ) Notice: Subject to any disclaimer, the term of this patent is extended or adjusted under 35 U.S.C. 154(b) by 0 days.

(21) Appl. No.: 12/580,550

(22) Filed: Oct. 16, 2009

Related U.S. Application Data

(60) Provisional application No. 61/106,718, filed on Oct. 20, 2008.

(51) Int. Cl.
*B61B 13/04* (2006.01)

(52) U.S. Cl.
USPC .......................................... 105/141; 105/147

(58) Field of Classification Search
USPC ........... 104/88.02–88.05, 118, 124, 295, 304, 104/242, 243, 244.2, 245–248
See application file for complete search history.

(56) References Cited

U.S. PATENT DOCUMENTS

| | | | | |
|---|---|---|---|---|
| 796,893 | A * | 8/1905 | Brennan | 180/219 |
| 1,947,119 | A * | 2/1934 | Walter | 105/141 |
| 4,089,270 | A * | 5/1978 | Blake | 104/130.09 |
| 4,195,576 | A * | 4/1980 | Gutridge | 105/147 |
| 5,289,778 | A * | 3/1994 | Romine | 104/88.04 |
| 5,329,857 | A * | 7/1994 | Owens | 104/103 |
| 5,372,072 | A * | 12/1994 | Hamy | 104/93 |
| 5,598,783 | A * | 2/1997 | Lund | 104/88.04 |
| 5,992,575 | A * | 11/1999 | Kim | 188/38 |
| 6,012,396 | A * | 1/2000 | Schulz | 105/72.2 |
| 6,029,104 | A * | 2/2000 | Kim | 701/20 |
| 6,263,799 | B1 * | 7/2001 | Pardes | 104/28 |
| 6,389,982 | B1 * | 5/2002 | Evensen | 104/124 |
| 6,393,993 | B1 * | 5/2002 | Reese | 104/130.01 |
| 6,810,817 | B1 * | 11/2004 | James | 104/88.04 |
| 7,721,656 | B2 | 5/2010 | Indio da Costa | |
| 2007/0256588 | A1 * | 11/2007 | Costa | 104/118 |
| 2010/0011986 | A1 * | 1/2010 | Pumpelly | 105/215.2 |

OTHER PUBLICATIONS

Author: Garabedian, Bruno, Benoit, Michel, Krut, Sebastien Title: A Futuristic Monorail Tramway Stabilized by an Inertia Wheel Date: May 30, 2007, pp. 1581-1586 Control and Automation, 2007. ICCA 2007. IEEE International Conference Montpellier, France.
Author: Louis Brennan Title: Mono-rail car Research indicates foreign patents filed in/around 1903-1907 Link: http://en.wikipedia.org/wiki/Gyro_monorail Information at the London Science Museum.

* cited by examiner

*Primary Examiner* — Jason C Smith
(74) *Attorney, Agent, or Firm* — Saul Ewing LLP

(57) ABSTRACT

RailPods are an alternative personal rapid transit system that operate on and utilize existing railroad infrastructure. Rail-Pods are one to two passenger vehicles that travel on one rail of a traditional railroad track. RailPods provide on-demand transportation to cities and towns where rail exists or can be built.

12 Claims, 9 Drawing Sheets

PERSONAL TRANSIT VEHICLE USING SINGLE RAILS

CROSS-REFERENCE TO RELATED APPLICATIONS

This provisional patent application claims no priority from any applications. No government funds were used for this invention

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2008 Brendan English.

BACKGROUND

1. Technical Field

This invention relates to transportation systems and more particularly to personal transit vehicles operating on single rails.

2. Background and Description of Prior Art

Mass transit systems have long been recognized as a desirable means of moving people. Mass transit systems run vehicles at regular intervals capable of moving large groups of people while making predesignated stops. Personal rapid transit (PRT) systems deploy smaller vehicles to move small groups of people with departure and destination based on the demands of the group.

Traditional PRT systems require a proprietary guideway such as a specialized monorail or track. These PRT guideways are distinct from mass transit system railways, expensive to build, and require long term negotiations with private land owners, local, state, and federal governments in order to implement their function. Further distinction from traditional mass transit systems occurs in how PRT vehicles change or turn direction when switching tracks. Traditional trains and light rail vehicles require the track to switch in order for the train to change path. Traditional PRT vehicles have on-board switching devices but require the proprietary guideway to perform such switching. Switching and controlling traditional PRT systems requires a robust communication system that relies on the installation of cable along the guideway or use of the guideway as the communication system. These PRT systems also pass this critical information back to a central computer that makes decisions for each vehicle. In contrast, traditional mass transit trains rely on an operator and trackside signals to communicate. Regardless of communication system, traditional trains as well as PRT's use a predetermined routing or a central computer to navigate along the track or guideway.

Obstructions are handled visually for traditional trains which have an operator to visually confirm that obstructions lie ahead. Traditional PRT systems elevate or submerge the guideway to prevent obstructions from blocking the path and/or use a network of cameras and an operator to inspect the track. Even without obstructions, a stability system is needed. Traditional trains use two rails to remain balanced, while PRT systems use multiple rails or wheels similar to a roller coaster that "clamp" onto the guideway. Additional safety measures are also needed at crossings. A traditional train traverses road crossings based on the types of safety systems installed at the crossing. Where no automated crossing gates exist, the train must proceed slowly in order to avoid vehicles and pedestrians. Where automated crossings exist the train can travel at higher speeds with an improved confidence in safety. Because of the large momentum of a train, a large breaking distance is required to stop and accelerate. Traditional PRT vehicles are generally smaller and lighter than traditional trains, and therefore require shorter breaking distances, but they still require safety gates or visual operator control at crossings.

Mass transit trains make scheduled stops in stations to allow passengers to board or depart. Traditional PRT systems generally stop only at a requested destination. This generally requires side tracks at stations to allow PRT vehicles to stop for boarding without interrupting PRT transit of other PRT vehicles. For boarding and destination selection, mass transit trains use station based kiosks or train attendants to process payment transactions. PRT systems use a similar station based kiosk for payment as well as determining station destination. Protecting stations and vehicles creates a security challenge for train owners. Trains employ a network of video cameras throughout rail yards to track and defray vandalism. For traditional mass transit system, these camera views may be blocked by large trains or require an attendant to monitor the activity.

Multiple prior disclosures, including U.S. Pat. No. 4,089,270 (Sep. 17, 1976) titled "Personal transportation system," United States Patent Application 20070256588 (Nov. 8, 2007) titled "Monorail vehicle," and international PCT application WO1999036303 (Jul. 22, 1999) titled "Monorail with bypass and method" disclose vehicles that ride on single rail specific to the disclosed vehicles. U.S. Pat. No. 1,947,119A (Feb. 13, 1934) titled "Monorail car and the like" further discloses a monorail vehicle that stabilizes vehicles on a single rail through a gyroscopic stabilizer or through auxiliary supporting blocks added on both sides of a rail.

BRIEF SUMMARY

RailPods are one to two person vehicles that travel on one of the rails of a conventional railroad track. As is well-known in the art, conventional railroad track generally consists of flat-bottomed steel rails supported with consistent spacing, according to the applicable track gauge, on timber or prestressed concrete "sleepers," or "railroad ties." The spaced rails are connected to the sleepers with resilient fastenings or cut spikes. The sleepers are supported on the ground on a railway bed, which is generally composed of crushed stone ballast. RailPod transit brings benefits including allowing two vehicles to pass each other on traditional conventional railroad track; operating with a guide shoe that keeps RailPods centered on a rail and allows for negotiation of track switches; operating with a skid-based stabilization system; and requiring no modifications to existing railroad infrastructure. RailPods compete with other personal rapid transit companies as well as traditional commuter buses, trains, and ride share services. RailPods offer on-demand personal transit utilizing existing railroad infrastructure. In other words, RailPods use existing railroad tracks as guideways to move passengers and packages in and out of cities and towns. RailPods may be stored at stations off the main track, allowing other RailPods to bypass stations and travel directly to the passenger's destination. Station storage also allows RailPods to be available waiting for passengers to arrive. Passengers may board a RailPod and enter destination information directly within the RailPod. RailPods are a low cost alternative to commuter rail and light rail services. RailPods can be deployed in small quantities and require little to no infrastructure changes. Rail- Pods can be marketed as feeder routes to existing commuter rail. In addition, RailPods can supplement existing commuter rail markets by extending service at the end of a line.

RailPods have many of the same features as personal rapid transit vehicles. RailPods are unique because they take advantage of a railroad track as the 'guideway'. RailPods utilize a single direction railroad track as a bi-directional guideway for RailPods. RailPods do not require the installation of new guideways. RailPods take advantage of underutilized railroad track such as freight track owners that use their track during non-commuting hours. This market allows freight track owners the opportunity to collect track usage fees during RailPod operating hours. At times when the track is needed for traditional freight trains, RailPods may be cleared from the track.

RailPods perform switching by using vehicle mounted guide shoes to perform the switching function. The functionality of this guide shoe is unique from traditional trains because it does not require the track to move. It is unique in comparison to traditional PRT vehicles because PRT vehicles require a specially designed guideway to accommodate a guide shoe. The guide shoes not only allow the RailPod to switch from one rail to another but also center the RailPod on one rail preventing derailment during all phases of operation. The guide shoes keep the RailPod's wheels on the rail. The wheels allow the RailPod to traverse gaps in the track (i.e. switch tracks and frogs). The wheels may be driven by electric in-wheel motors. The motors may be powered by batteries that can be charged at a station or on-board generator.

A RailPod remains balanced on one rail through the use of stabilization skid arms and a pair of counter rotating gyros. A pair of counter rotating gyros provide for primary stabilization. Counter rotating gyros are used to avoid unwanted precession while the vehicle is in a turn. A RailPod uses one or more skid arms under each side as a backup to the gyro stabilization system. The skids may drag on railroad ties during slow speeds and while the RailPod is at rest. A combination of accelerometers and height sensors may determine if the RailPod is level, while the skid height may be controlled by a linear actuator. The skids allow obstacles to be navigated without tipping the RailPod over. A shock/dampener connected to the skid arm and linear actuator may accommodate rapid impact. The skid arms contact the surface during loading and unloading phases.

RailPods may contain a wireless non-critical data communication system. Critical decisions may be made internal to the RailPod. The RailPod communication system allows the capability of sharing position (velocity, acceleration, direction) information, passenger demand requests, and fault information on a non-critical wireless system. RailPods may use a non-critical wireless communication system because RailPods may rely on the obstruction sensors to make real time critical decisions. The communication system may be a cooperative system that requires each RailPod be within cellular coverage to pass data. The communication system may pass passenger demand information between RailPods and provide position information to a central monitoring station. As the communication system need not be a critical system, a RailPod could be outside of cellular coverage and still operate using critical non-cooperative obstruction sensors.

The navigation system may determine a RailPod's current position from position sensors such as, but not limited to, GPS devices or accelerometers, and destination information from the passenger user interface. An in-vehicle database, containing track switch locations and station locations, may be queried based on a passenger's destination to determine the routing the RailPod will take. The RailPod navigation system may operate independently of any central control. The navigation system may use on-board sensors to determine if an obstacle is ahead of the RailPod. The obstruction sensors, track database, and position sensors may be classified as critical services. This allows the communication system to be classified as a non-critical service rather than a critical service. Therefore RailPods may operate safely in case the wireless communication network fails or suffers from low bandwidth coverage areas.

Obstruction sensors may include, but are not limited to, ultrasonic, infrared, laser/lidar, or photographic imaging. The combination of obstruction sensors may determine if another vehicle is in front of, or if there is an intruder on the tracks, or foreign obstacles such as, but not limited to, tree limbs, rocks, or cars, obstructing the path. In addition to these sensors the passenger may be provided with a red emergency stop button to stop the RailPod. When an obstruction is cleared the passenger may press a green button indicating that the RailPod can continue along the route.

RailPods are light weight requiring short distances for stopping and starting. At road crossings where there are no automated safety gates, a RailPod may be required to stop. Road crossing locations may be contained in the track database. As each crossing is encountered, a RailPod may slow to a stop prior to the crossing, requiring a passenger to press a green "continue" button after verifying that the road is clear. At road crossings where the RailPod has the right of way such as at automated safety gates, the RailPod may continue uninterrupted through the crossing. Alternatively, tunnels or bridges may be created under or over road crossings. These tunnels or bridges may be offset from the main track and dedicated for RailPods only. Shorter spans may be utilized of the smaller size of a RailPod relative to traditional rail vehicles.

A computer human interface may allow passengers to select destinations and payment options. RailPods may use an in-vehicle payment system and allow passengers to select destinations within the vehicle. In addition, the interface may allow passengers to change destination stations while en-route. When a RailPod is in motion, passengers may view a moving map with advertisements.

Passengers may be required to establish an online RailPod account to gain RailPod access. A card reader may be installed on the exterior of each RailPod to collect passenger information such as, but not limited to, passenger name and card number. Passenger information may be directed through the on board cellular communication system to a central database. The database may contain a list of all passengers that have established an account. If a passenger exists in the database, the RailPod door may unlock to allow access to the passenger compartment. RailPods may ensure that the appropriate passenger gains access to a RailPod without requiring additional trackside infrastructure.

Each RailPod may contain a panoramic camera to monitor the immediate environment around the RailPod. The system may start recording when movement is sensed and retain the recorded data for analysis via the wireless network or physical retrieval. The recorded data may be removed from the system after a passenger completes a trip or an event has been resolved.

Features and Advantages

RailPods may be, but are not limited to, hybrid or electric only automated vehicles. RailPods are very similar to personal rapid transit systems, but are unique because they utilize existing railroad track as a guideway. With the increase in fuel costs, traffic, and population growth, commuters and city planners are in need of low cost alternative transportation solutions. Installing new infrastructure is costly and difficult to justify financially for many cities. Throughout the world, there are many underutilized conventional railroad tracks. In many cases these railroad tracks are used only once a day and in some areas only once a month or are not used. RailPods take advantage of these underutilized tracks by offering a vehicle that travels on one of the two rails. Using only one of the rails allows two RailPods to bypass one another, essentially creating a bidirectional guideway without a need to install new infrastructure. RailPods provide a personal, automated, on-demand passenger service on underutilized railroad tracks. Many suburban towns have underutilized railroad track that could act as a feeder to existing commuter rail services or in some cases deliver passengers directly to the city center. When a railroad track is needed for traditional trains, RailPods may be relocated to a storage track to allow traditional trains to pass. RailPods may be purchased by regional transportation companies due to both low initial costs and low operating costs. The overall cost is kept low by eliminating the need to install a proprietary guideway. Railroad owners may offer the use of a railroad track at a per use rate, or may operate their own RailPods. The end user, a passenger, may make payments through a prepaid online accounting system that may charge the passenger based on the distance traveled. Because of the low cost, RailPods can be purchased by companies in addition to governments. Due to RailPods' utilization of existing infrastructure, RailPods may be rapidly deployed at very low costs. In addition, RailPods are scalable. As demand increases, additional RailPods can be integrated with the original fleet purchase. RailPods provide a low cost, scalable personal rapid transit system solution capable of being rapidly deployed.

Because RailPods have a relatively small vehicle size, electric batteries may provide power to electric motors that drive the vehicle. Batteries may be re-charged at stations or alternatively a small efficient generator may be installed in each RailPod.

RailPods may use a combination of obstruction sensors. Different sensors may operate with varying efficiency under varying conditions. Having multiple sensors may improve the reliability of obstruction detection under all environmental conditions.

RailPods may utilize different means, including but not limited to plug breaking or electric regenerative breaking, as a primary means of stopping. The advantage of regenerative breaking is to recharge batteries. Alternatively, plug breaking allows for quicker stops, dissipating the energy into heat. An electrically actuated mechanical brake may also be used for breaking, including, but not limited to, emergency stops and securing the RailPod at a station.

Controlled access may prevent non-RailPod users from entering. Additionally, motion activated video recording may be built into the RailPod. The advantage of controlled access is to reduce the requirement of having a controlled access point such as a kiosk with attendant at a boarding station. The motion activated video may capture events internal to the RailPod as well as within the immediate vicinity.

Boarding and departure stations may be built as low cost 'bulge station' extensions to existing railroad tracks. These 'bulges' may provide RailPods with a secondary rail for boarding or departing passengers. The bulge stations may take advantage of the same materials used on traditional railroad track and not interfere with the operations of a traditional train. These stations provide an advantage to rapidly install a RailPod station on existing right-of-way property. In addition, bulge stations may act as storage locations when RailPods are not in use or when a traditional train needs to traverse the track.

A wireless communication system may provide operations with position, velocity, and unique characteristics for each RailPod on a central monitoring display. The benefits of a cellular communication system include the low cost and already deployed infrastructure without requiring a proprietary radio and associated communication spectrum. RailPods may use on-board sensors to make critical decisions, while the communication system may be used for non-critical events such as, but not limited to, passenger requests and monitoring from an operations facility. An additional benefit is that RailPods do not require expensive or proprietary communications hardware.

Intelligent guide shoes may be built into each RailPod. The guide shoes eliminate the need to perform track switching from a remote facility. The guide shoes may physically identify a switch and, based on information from the track database, determine the direction the guide shoe should follow. The guide shoes may center a RailPod's wheels on the track preventing a derailment.

Ground level handicap access may be integrated into a RailPod. This access may be built into the door of a RailPod and may provide a ramp leading to the passenger compartment. The advantage of this feature is to allow for Americans with Disabilities Act (ADA) compliance emergency egress from RailPods in almost all locations along the track and to reduce the cost of modifying existing ground level stations. This access feature may eliminate the need to build stations specifically for Railpods. In addition, these ramps may provide additional stability during boarding and de-boarding operations.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Terminology

The terminology and definitions of the prior art are not necessarily consistent with the terminology and definitions of the current invention. Where there is a conflict, the following definitions apply.

Parallel rails—One railroad track consists of two parallel rails. Standard gauge railroad track has two parallel rails that are separated by approximately 4 feet, 8.5 inches.

Railroad Track—Consists of two parallel rails, normally made of steel, secured to crossbeams called railroad ties or sleepers.

Personal Rapid Transit (PRT)—A transportation system that provides on-demand non-stop transportation.

Guideway—A track, railway, or other pathway on which transit vehicles travel.

Frog—A crossing of point of two rails, usually as a common crossing or V-crossing. This can be assembled out of several appropriately cut and bent pieces of rail or can be a single casting A frog forms part of a railroad switch, and is also used in a level junction or flat crossing.

Bulge Stations—Narrow expansions to existing railroad track that extend the railroad ties to allow for a tertiary rail. The tertiary rail and ties 'bulge' out horizontally from the existing railroad track. These tertiary rails do not interfere with traditional railroad operations. Therefore a traditional train can pass a Bulge Station without any switches or removal of RailPods.

Operation

The following detailed description of the invention references the accompanying drawings which form a part hereof, and in which are shown, by way of illustration, specific embodiments in which the invention may be practiced. Understand that other embodiments may be used, and structural changes may be made without departing from the scope of the present invention.

Figure 1:
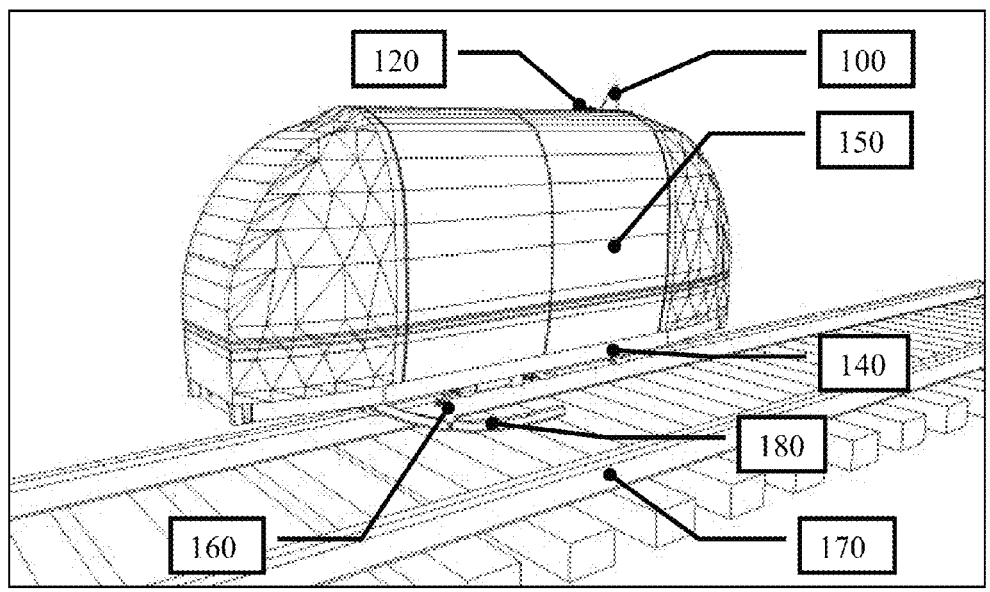
FIG. 1 is a view of a RailPod.
Figure 2:
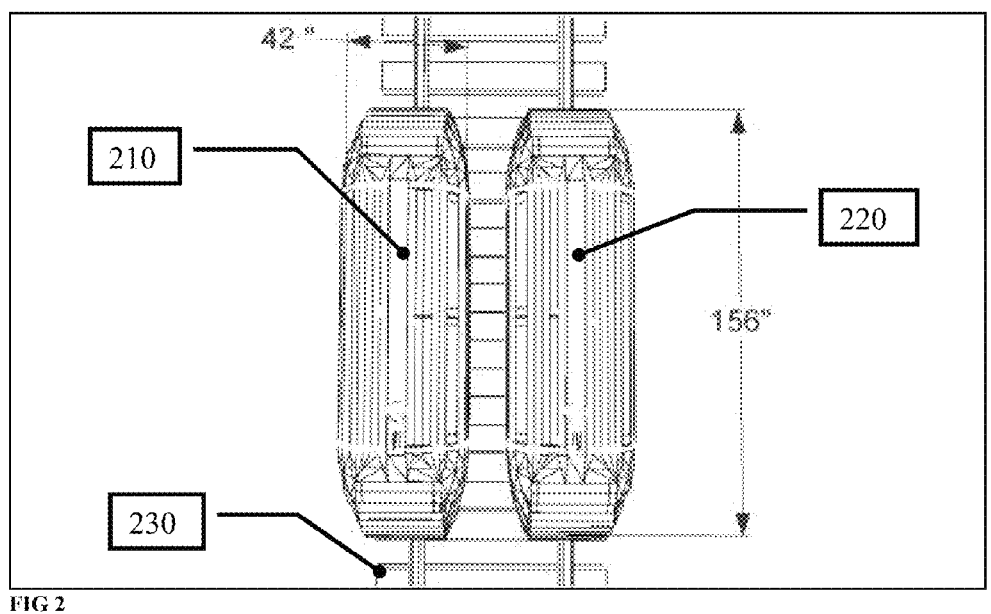
FIG. 2 is a top view showing two RailPods sharing a railroad track.
Figure 8:
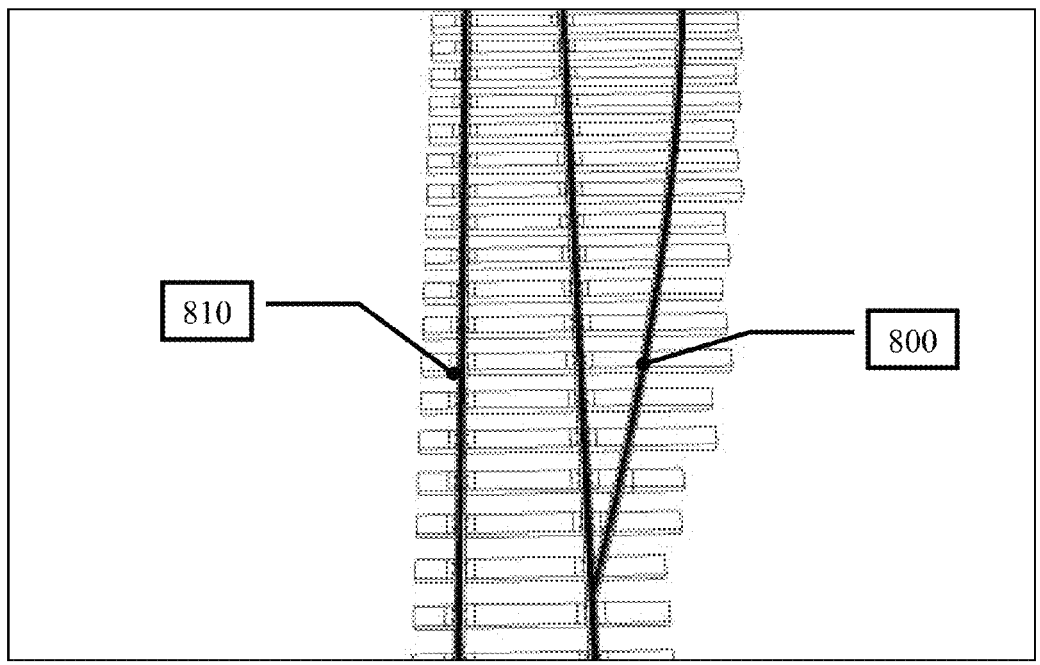
FIG. 8 is a view of a rail-line branch to a Rail Pod Bulge station.
Figure 9:
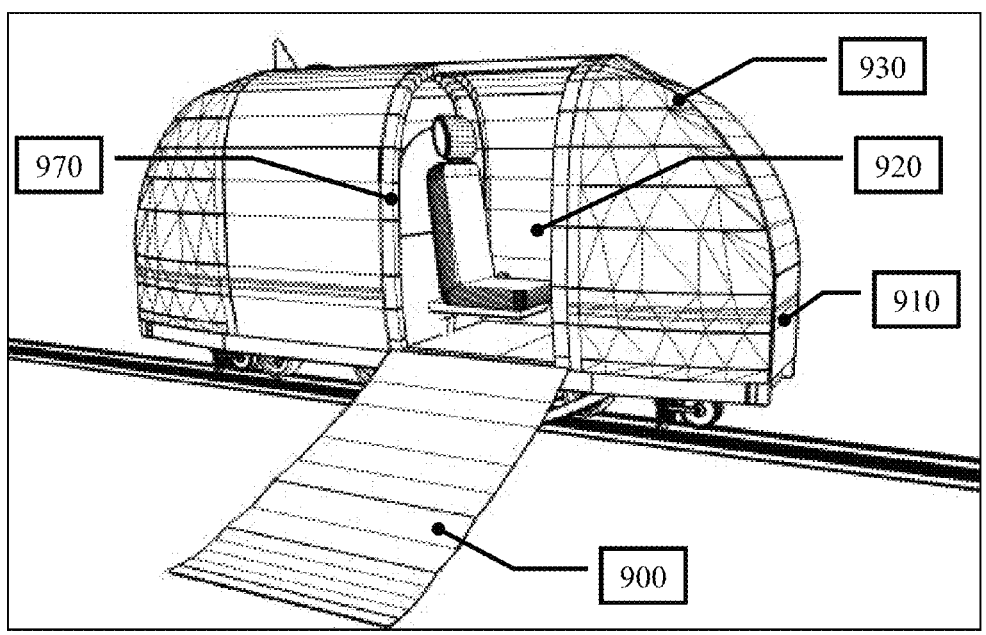
FIG. 9 is a view into the passenger compartment of a Rail Pod open for boarding.

RailPods have many of the same features as PRT vehicles, however historically PRT systems require a proprietary or PRT-specific guideway. Referring to FIG. 1, RailPods are unique because they take advantage of existing railroad track 170 as the guideway. Referring also to FIG. 2, RailPods utilize a single direction railroad track 230 as a bi-directional guideway for RailPods. This allows RailPods 210 and 220 to pass each other on the same railroad track. RailPods may be approximately 13 feet long to accommodate up to two passengers, although longer or shorter RailPods could be built. RailPods may be approximately 3.5 feet wide to accommodate passengers and safe passage of two RailPods on the same railroad track. Referring also to FIG. 8, at times when the track is needed for traditional trains, the RailPods may be cleared from the track and stored at bulge station 800 or other dedicated storage areas.

Figure 4:
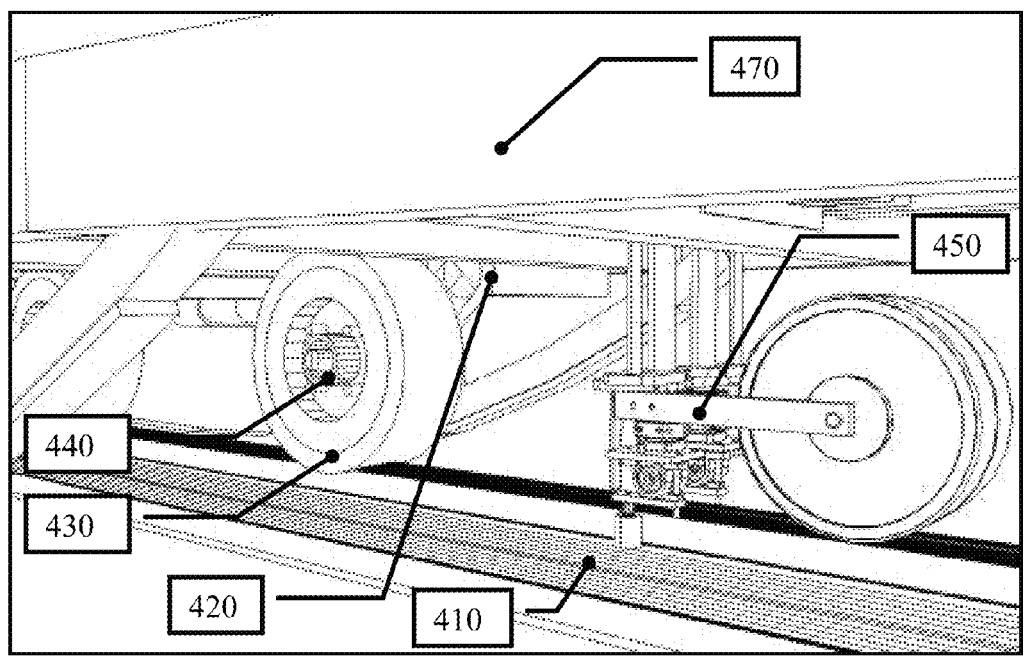
FIG. 4 is a view of a guide shoe, wheels and stabilization system of a RailPod.
Figure 5:
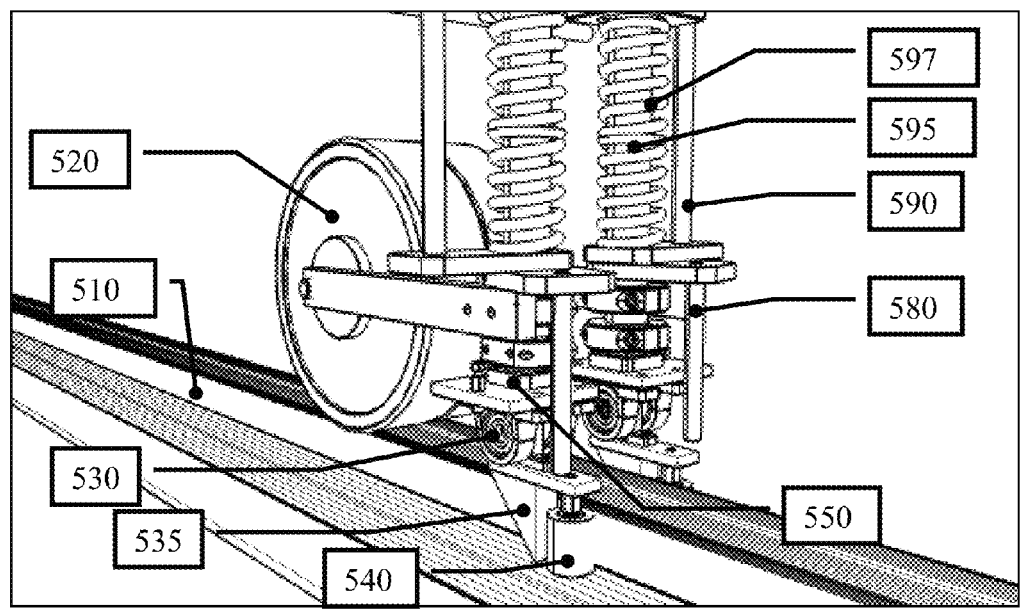
FIG. 5 is a view of the lower section of a guide shoe for keeping a RailPod on a track.
Figure 6:
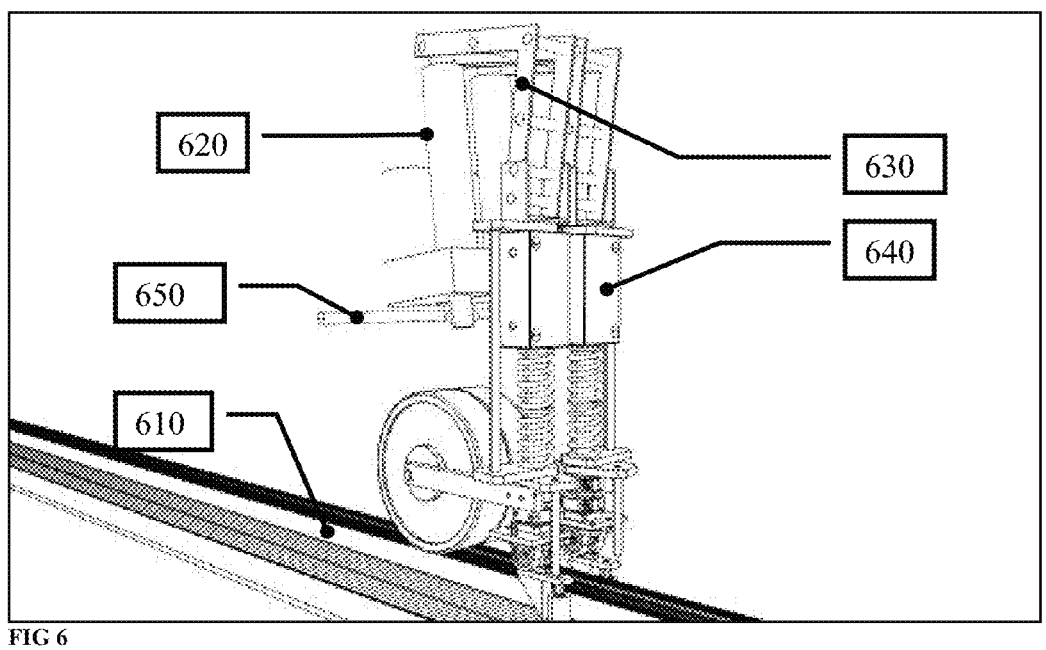
FIG. 6 is a view of the upper section of a guide shoe.
Figure 7:
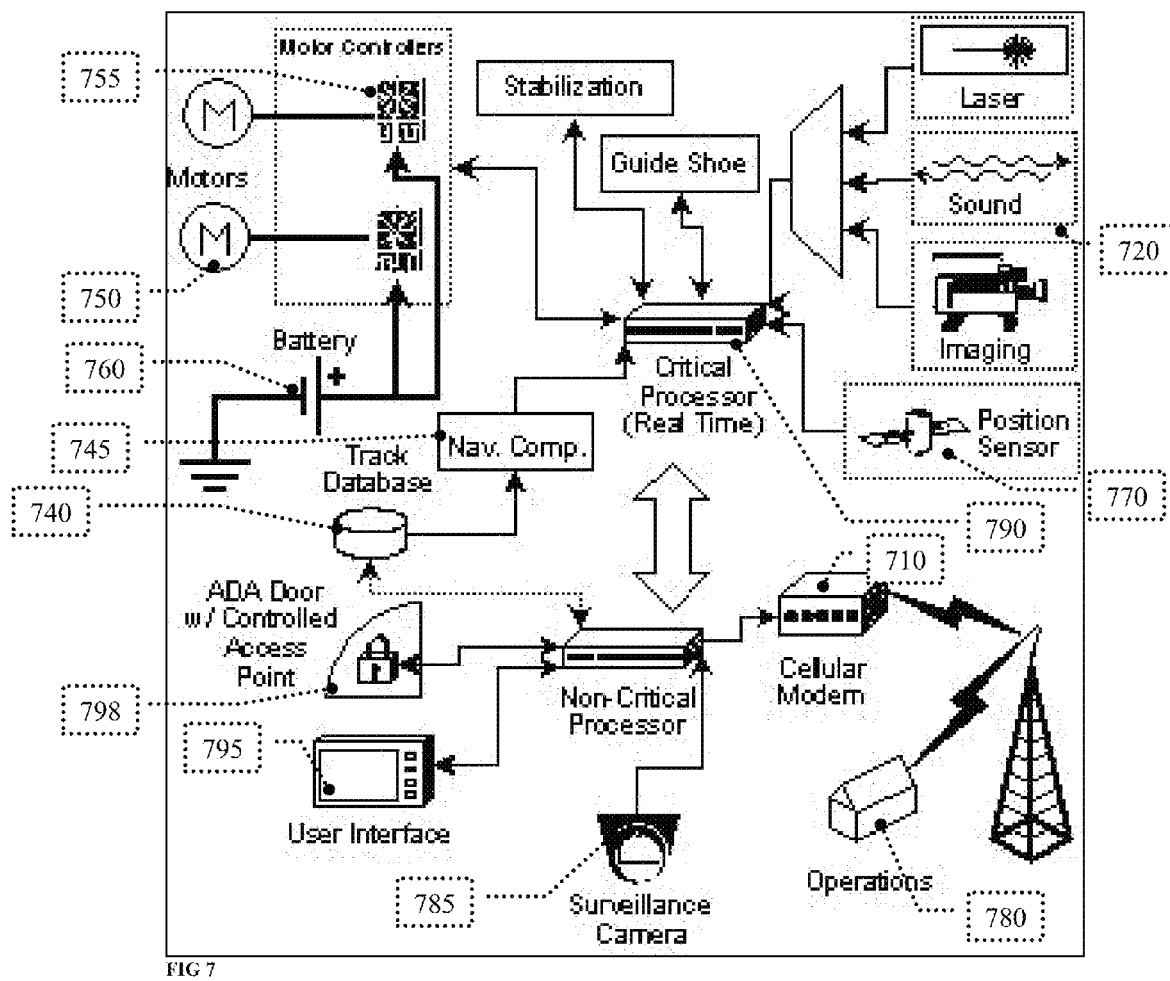
FIG. 7 is a block diagram depicting electrical and electromechanical components used in RailPod operations.

Referring also to FIGS. 4 & 5, RailPods may contain intelligent guide shoes 450 that center a RailPod on one rail and may also allow RailPods the capability to switch from one rail to another. A guide shoe may have main wheel 520 that is capable of traversing frogs and switch tracks in rail 510. Side roller bearing 540 may contact with rail 510 in almost all phases of operation. When encountering an obstruction, ramp 535 may pivot side roller bearing 540 up to clear the obstruction using pivot point 530. The lower knuckle, which consists of knuckle plate 550, pivot point 530, and side roller bearing 540, may pivot along the horizontal access allowing for changes in dimensions along rail 510. Roller bearing tension may be maintained through the use of coiled spring 597 connected between knuckle plate 550 and stop rod 580. When traversing a frog, one half of the guide shoe may raise and lower to perform the switching operation. Referring also to FIG. 6, the guide shoe may be connected to a RailPod via linear bearings 640. Main shaft 595 provides vertical support while secondary shaft 590 provides supplemental support in the horizontal direction. Linear actuators 620 for each half of the guide shoe may be connected to L-bracket 630 that connects to the top of the guide shoe. Guide shoe linear actuators 620 may receive instructions from critical processor 790 in order to raise or lower the guide shoe. Guide shoe linear actuators 620 may also be connected to RailPod chassis 470, 140, 360 via supporting rod 650.

Wheels 430 ride on single rail 410. RailPod standard configuration includes four wheels. Wheels 430 are mounted on hubs 440 which are mounted on torsion axles 420. The wheels are driven by electric in-wheel motors 750. The motors may be controlled by motor controllers 755 receiving instructions from the critical processor 790 which may be powered by batteries 760 that may be charged at a station, other charging location, or through an on-board generator.

Figure 3:
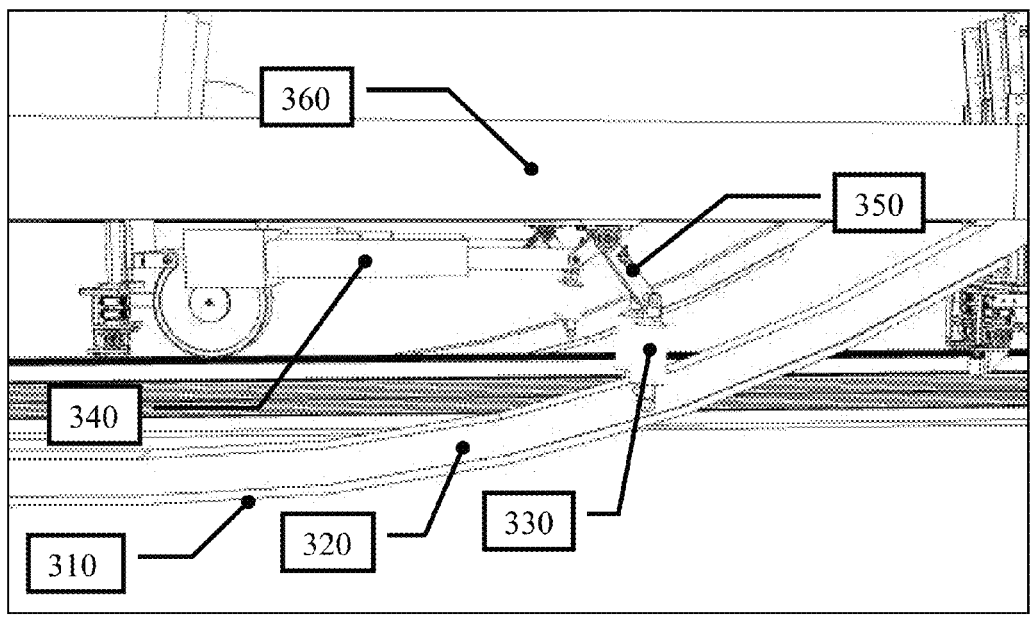
FIG. 3 is a view of a skid arm suspension system connected to a RailPod.

Referring also to FIG. 3, RailPods remain balanced on one rail through the use of gyros and stabilization skid arms 320, 180. At least one skid arm is connected under each side of the RailPod. The skid arms may drag skid plate 310 on railroad ties during low speeds, typically less than approximately 5 MPH, and while the RailPod is at rest. Alternatively, skid plate 310 may be replaced with a rotating belt that surrounds the skid arm reducing friction when the skid is in contact with the ground. The skid height may be controlled by linear actuator 340. Accelerometers, height sensors, or other leveling devices may determine if the RailPod is level. The skid arms allow obstacles to be navigated without tipping RailPods over. Dampeners or shocks 330, 160 allow for rapid impact response, allowing linear actuator 340 to adjust without sacrificing vehicle stability. A mechanical advantage may be acquired through the use of links 350 to further reduce the response time required of linear actuator 340.

RailPods may contain wireless non-critical data communication system 710 that allows RailPods the capability to share position information, including but not limited to velocity, acceleration, and direction, along with passenger demand requests, fault information, and other non-critical data. The communication system may be a non-critical service, meaning the RailPod could be outside of communication coverage and still operate using obstruction sensors 720. The communication system may provide passenger demand information as well as RailPod position information 770 to central monitoring station 780. RailPods may contain database 740 including switch track and station location data. Database 740 may operate with positioning system 770 to provide input to navigation system 745 that is processed by critical processor 790.

The navigation system may determine a RailPod's current position from position sensors 770 and destination information from passenger user interface 795. Position sensors 770 may include, but are not limited to, devices such as global positioning systems (GPS) connected to antenna 120 or accelerometers. Database 740 may be queried to determine the routing a RailPod will take. The routing may contain the position and quantity of switch tracks that need to be negotiated by the guide shoe. The navigation system may operate independently of any central control. The navigation system may use on-board sensors to determine if an obstacle is ahead of the RailPod. Obstruction sensors 720, database 740, and position sensors 770 are all classified as critical services. This allows the communication system 710 and communication antenna 100 to be classified as a non-critical service. This allows RailPods to operate safely even if the wireless communication network fails or suffers from low bandwidth coverage areas.

Obstruction sensors 720, located in nose compartment 910 may include, but are not limited to, ultrasonic, infrared, laser/lidar, and photographic imaging. The combination of these sensors may determine if another vehicle is in front of a RailPod, or if there is an intruder or obstruction on the tracks. In addition to these sensors RailPods may include red emergency stop button located in passenger compartment 920 that passengers may press to stop RailPods. When the obstruction is cleared the passenger may press a green button also located in passenger compartment 920 indicating that the RailPod can continue along the route.

RailPods may utilize different means, including but not limited to plug breaking or electric regenerative breaking, as a primary means of stopping the vehicle. The advantage of regenerative breaking is to recharge batteries. Alternatively, plug breaking allows for quicker stops, dissipating the energy into heat. An electrically actuated mechanical brake may also be used for breaking, including, but not limited to, emergency stops and securing the vehicle at a station.

Traversing road crossings where the RailPod is required to stop may be processed in a similar fashion as obstacles. Road crossing locations may be contained in the database 740. As each crossing is encountered, the RailPod may slow to a stop prior to crossing and requiring a passenger to press green button 920 after verifying that the road is clear. At crossings where RailPods have the right of way, RailPods may continue uninterrupted through the crossing. As an alternative to crossings, tunnels or bridges may be created to allow RailPods to bypass crossings. These tunnels or bridges may handle all rail traffic or be offset from the main track and dedicated for RailPods only. Shorter spans may be utilized when accommodating RailPod-only use due to the smaller size of a RailPod relative to traditional rail vehicles.

Computer human interface 795 allows the passenger to select destinations and payment options. When a RailPod is in motion, passengers may view a moving map with advertisements. The passenger may exit the moving map option and select new destinations throughout the trip.

RailPod access may be restricted to passengers that have established an online payment account. Card reader 970 may be attached on the exterior of a RailPod to collect passenger information, including but not limited to name and card number. The passenger information may be directed through onboard wireless communication system 710 and transmitted to central database 780. Central database 780 may contain a list of all passengers that have established accounts. If the passenger account exists in the database, lock 798 on RailPod door 150 may unlock allowing access to the passenger compartment.

Ground level handicap access may be integrated into a RailPod. This access may be built into door 150 of a RailPod and may provide ramp 900 leading to the passenger compartment. This access feature may eliminate the need to build stations specifically for Railpods. In addition, these ramps may provide additional stability during boarding and de-boarding operations.

RailPods may contain panoramic camera 785 located in the position of 930 to monitor the immediate environment around the RailPod. The system may start recording when movement is sensed and retain the recorded data for analysis via the wireless network or physical retrieval. The recorded data may be removed from the system after a passenger completes a trip or an event has been resolved.

Other Embodiments

As will also be apparent to those skilled in the art, RailPods can be marketed to areas where existing rail services exist. RailPods can supplement existing commuter rail services during off-peak hours.

It is apparent that not only can RailPods move passengers, but package delivery is also a feature. RailPods may be linked directly to an airport where passengers and freight can be distributed locally without the need of drivers.

Although RailPods' unique feature is the use of existing railroad infrastructure, it is apparent that they can traverse a modified railroad track where only one rail is used allowing RailPods to extend into areas where traditional rail does not exist, or where a traditional PRT system is needed. RailPods are an intermodal transportation vehicle.

Understand that the above description is illustrative, and not restrictive. Many other embodiments will be apparent to those of skill in the art upon reviewing the above description. Determine the scope of the invention with reference to the appended claims, along with the full scope of equivalents to which such claims are entitled.

I claim:

1. A personal transportation vehicle configured to operate on a conventional railroad track system comprising a first rail and a second rail supported in a spaced relationship on sleepers supported on a railway bed, the personal transportation vehicle comprising:
   a first vehicle unit elongated in a first direction, said first vehicle unit comprising:
   at least two wheels positioned on said first vehicle unit to support said first vehicle unit above one of said first and second rails;
   a motor operatively connected to said at least two wheels, to drive said at least two wheels and propel said first vehicle unit along said one of said first and second rails;
   at least one guide shoe positioned on said first vehicle unit to engage said one of said first and second rails, said guide shoe being configured to maintain said at least two wheels on said one of said first and second rails when traversing a switch track, or frog of the conventional railroad track system;
   a skid stabilization system comprising at least one skid arm supporting a skid plate, the skid arm being supported on said first vehicle unit in an operable position in which said skid plate is positioned to ride on sleepers of the conventional railroad track system; and
   a gyro stabilization system connected to the first vehicle unit to maintain stability of the first vehicle unit.

2. A personal transportation vehicle of claim 1 wherein the skid stabilization system comprises
   (a) a free rolling linked track or belt to minimize friction upon contact with the ground;
   (b) a skid obstruction sensor to detect obstructions in front of said skid stabilization system;
   (c) a skid height sensor to determine height of said skid stabilization system; and
   (d) suspension system to absorb impact upon contact with ground or obstructions.

3. A personal transportation vehicle of claim 1 wherein the guide shoe comprises wheels or bearings that:
   surround a head of said one of said first and second rails and centers the vehicle on said one of said first and second rails while transitioning through one or more switch tracks or frogs; and
   traverse a switch independent of the switch position or direction of approach.

4. The personal transportation vehicle of claim 1, further comprising:
   an obstruction sensor that autonomously stops the first vehicle unit; and
   a track database comprising the location of switch tracks for navigation purposes.

5. The personal transportation vehicle of claim 1, wherein said at least one guide shoe comprises:
   a main wheel positioned to ride on an generally horizontal upper surface of said one of said first and second rails to traverse switch tracks and frogs of the conventional railroad track system;

a side roller bearing positioned to ride on a generally vertical side surface of said one of said first and second rails, said side roller bearing being supported on an arm biased by a spring toward an active position in which said side roller engages said side surface of said one of said first and second rails, said arm comprising a ramp positioned to engage a switch track or frog of the conventional railroad track system and cause the arm and side roller to pivot away from the active position while traversing the switch track or frog.

6. The personal transportation vehicle of claim 1, further comprising a second guide shoe, the guide shoes being respectively positioned to engage opposite sides of said one of said first and second rails.

7. The personal transportation vehicle of claim 6, wherein each of said guide shoes comprises:
   a main wheel positioned to ride on an generally horizontal upper surface of said one of said first and second rails to traverse switch tracks and frogs of the conventional railroad track system;
   a side roller bearing positioned to ride on a generally vertical side surface of said one of said first and second rails, said side roller bearing being supported on an arm biased by a spring toward an active position in which said side roller engages said side surface of said one of said first and second rails, said arm comprising a ramp positioned to engage a switch track or frog of the conventional railroad track system and cause the arm and side roller to pivot away from the active position while traversing the switch track or frog.

8. The personal transportation vehicle of claim 1, wherein said at least one guide shoe is operatively connected to a linear actuator operable to raise and lower said at least one guide shoe.

9. The personal transportation vehicle of claim 1, wherein said skid stabilization system further comprises at least one linear actuator operable to cause said skid arm to move into and out of the operable position.

10. A personal transportation method comprising:
   providing a first vehicle unit, wherein the first vehicle unit comprises:
   at least two wheels connected to the first vehicle unit;
   at least one guide shoe connected to the first vehicle unit;
   a skid stabilization system connected to the first vehicle unit; and
   a gyro stabilization system connected to the first vehicle unit to maintain stability of the first vehicle unit;
   an obstruction sensor that autonomously stops the vehicle;
   providing a standard gauge railroad track system comprising a first rail and a second rail configured in parallel; and
   maintaining said at least two wheels on the first rail of said standard gauge railroad track;
   transitioning the first vehicle unit through standard gauge railroad switch tracks, frogs, points, guard rails, diamonds or crossings;
   configuring the first vehicle unit to allow it to pass a second vehicle unit connected to the second rail of the standard gauge railroad track system without requiring modifications to the standard gauge railroad track; and
   providing a track database comprising the location of switch tracks for navigation purposes.

11. The personal transportation method of claim 10 wherein the size of said first vehicle allows for said first vehicle to:
   be stored at a station off of the conventional railroad track used for travel; and
   accept multiple passengers and freight; and
   be transported via pick-up truck for off-site maintenance.

12. A personal transportation vehicle that operates on a conventional railroad track system, the conventional railroad track system comprising a first rail and a second rail supported in a spaced relationship on sleepers supported on a railway bed,
   wherein said first rail is parallel to the second rail and separated from said second rail by approximately 4 feet, 8.5 inches, wherein the personal transportation vehicle comprises:
   a first vehicle unit having a width of up to about 7 feet, the first vehicle unit connected to the first rail of the conventional railroad track system;
   at least two wheels connected to the first vehicle unit;
   at least one guide shoe connected to the first vehicle unit, wherein the guide shoe maintains contact of the said at least two wheels on the first rail of the conventional railroad track, thereby allowing the vehicle unit to transition through one or more switch tracks, frogs, points, guard rails, diamonds or crossings;
   a skid stabilization system connected to the first vehicle unit;
   a gyro stabilization system connected to the first vehicle unit, wherein the gyro stabilization system maintains stability of the first vehicle unit;
   an obstruction sensor that autonomously stops the first vehicle unit; and
   a track database comprising the location of switch tracks for navigation purposes.

\* \* \* \* \*

UNITED STATES PATENT AND TRADEMARK OFFICE
CERTIFICATE OF CORRECTION

PATENT NO. : 8,720,345 B1
APPLICATION NO. : 12/580550
DATED : May 13, 2014
INVENTOR(S) : Brendan T. English It is certified that error appears in the above-identified patent and that said Letters Patent is hereby corrected as shown below:

In the SPECIFICATION:

column 2, line 49, delete "on traditional" and insert -- on --.

Signed and Sealed this
Fourteenth Day of October, 2014

Michelle K. Lee
*Deputy Director of the United States Patent and Trademark Office*